United States Patent [19]

Geller et al.

[11] Patent Number: 5,276,374
[45] Date of Patent: Jan. 4, 1994

[54] GAS-COOLED ELECTRIC MACHINE

[75] Inventors: Marius Geller, Fislisbach; Stefan Lanz, Zürich; Ivan Novosel, Möriken; Hans Zimmermann, Mönchaltorf, all of Switzerland

[73] Assignee: Asea Brown Boveri Ltd., Baden, Switzerland

[21] Appl. No.: 887,935

[22] Filed: May 26, 1992

[30] Foreign Application Priority Data

Jun. 15, 1991 [EP] European Pat. Off. ........ 91109833.3

[51] Int. Cl.⁵ .................... H02K 9/00; H02K 9/12; H02K 3/46
[52] U.S. Cl. ........................ 310/59; 310/55; 310/58; 310/260
[58] Field of Search .............. 310/52, 55, 56, 58, 310/59, 60K, 60A, 260

[56] References Cited

U.S. PATENT DOCUMENTS

| | | | |
|---|---|---|---|
| 2,873,393 | 2/1959 | Baudry | 310/55 |
| 2,900,538 | 8/1959 | Tudge | 310/59 |
| 2,915,655 | 12/1959 | Baudry | 310/55 |
| 2,951,954 | 9/1960 | Willyoung | 310/61 |
| 3,693,036 | 9/1972 | Schmitt | 310/52 |
| 3,702,964 | 11/1972 | Kudlacik et al. | 310/52 |
| 3,822,389 | 7/1974 | Kudlacik | 310/53 |
| 3,955,110 | 5/1976 | Karlen | 310/59 |
| 4,629,917 | 12/1986 | Brem | 310/59 |

FOREIGN PATENT DOCUMENTS

| | | | |
|---|---|---|---|
| 0427208 | 5/1991 | European Pat. Off. | |
| 1027775 | 4/1958 | Fed. Rep. of Germany | 310/55 |
| 511173 | 1/1955 | Italy | |
| 57-20141 | 2/1982 | Japan | |
| 73333 | 9/1916 | Switzerland | |
| 724456 | 2/1955 | United Kingdom | 310/58 |
| 786725 | 11/1957 | United Kingdom | 310/65 |
| 1450501 | 9/1976 | United Kingdom | |

OTHER PUBLICATIONS

Brown Boveri Technik Mar. 1986: "Luftgekuhlte Turbogeneratoren Der 200–MVA–Klasse" p. 135.

Primary Examiner—Steven L. Stephan
Assistant Examiner—C. LaBalle
Attorney, Agent, or Firm—Oblon, Spivak, McClelland, Maier & Neustadt

[57] ABSTRACT

In the gas-cooled electric machine, the stator winding bars, which are connected to one another electrically and mechanically outside the stator core assembly (2) in the overhang space by means of metallic lugs, are provided with caps (8) which virtually completely surround the lugs while leaving free one or more approximately axially extending ducts (9). These ducts (9) are open towards the stator core assembly (2). At its end on the partition side, the cap (8) has an opening (10) which is freely connected to said ducts (9). A flexible line (11) leads from this opening directly into the suction chamber (14) of the fan (5).

As a consequence of the pressure difference between the suction chamber (14) and overhang space (13), some of the coolant conveyed by the fan (5) flows through said ducts and cools the rod ends and lugs (7).

6 Claims, 3 Drawing Sheets

GAS-COOLED ELECTRIC MACHINE

BACKGROUND OF THE INVENTION

1. Field of the Invention

The invention relates to a gas-cooled electric machine having a rotor, a stator and a housing surrounding the stator, having one or two stator winding bars which are located one above the other in a groove, are built up from mutually insulated component conductors and are connected to one another electrically and mechanically outside the stator core assembly in the overhang space by means of metallic lugs to form a winding, and having essentially radial slots or ducts in the stator through which cooling gas can be led and a fan on each machine side whose suction chamber is separated by a partition from the overhang space.

In this regard, the invention refers to a prior art such as emerges, for example, from the journal BROWN BOVERI TECHNIK 3-86, page 135.

2. Discussion of Background

In electric machines having an indirectly cooled stator winding, the gas flow which leaves the fan and passes through the winding overhang has so far been sufficient to cool the front brackets in the winding overhang, and especially the lugs which connect the individual conductor bars electrically and mechanically to the actual coil. In limit-rating machines, the winding overhangs and lugs can be endangered by excessive heating. Whereas the part of the winding embedded in the winding grooves is cooled in a targeted fashion, these exposed winding parts, as well as the lugs, are heated not only by the current flow but also by the electromagnetic fields in the overhang space. Particularly endangered in this case is the insulation in the region of the lugs and—if the lugs are not hard-soldered—the entire construction of the connecting conductors and the lugs.

SUMMARY OF THE INVENTION

It is the object of the invention to provide an electric machine of the generic type mentioned at the beginning, in which the ends of the winding overhang can also be optimally cooled.

This object is achieved according to the invention when the lugs are provided with a cap which surrounds the lug, and there are provided in the lug or in the cap ducts which extend essentially axially and are open towards the stator core assembly, and the cap has at its end on the partition side an opening which is freely connected to said ducts and is connected to a flexible line which leads directly into the suction chamber of the fan.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which schematically represents exemplary embodiments of the invention and wherein.

DESCRIPTION OF THE PREFERRED EMBODIMENTS

Figure 1:
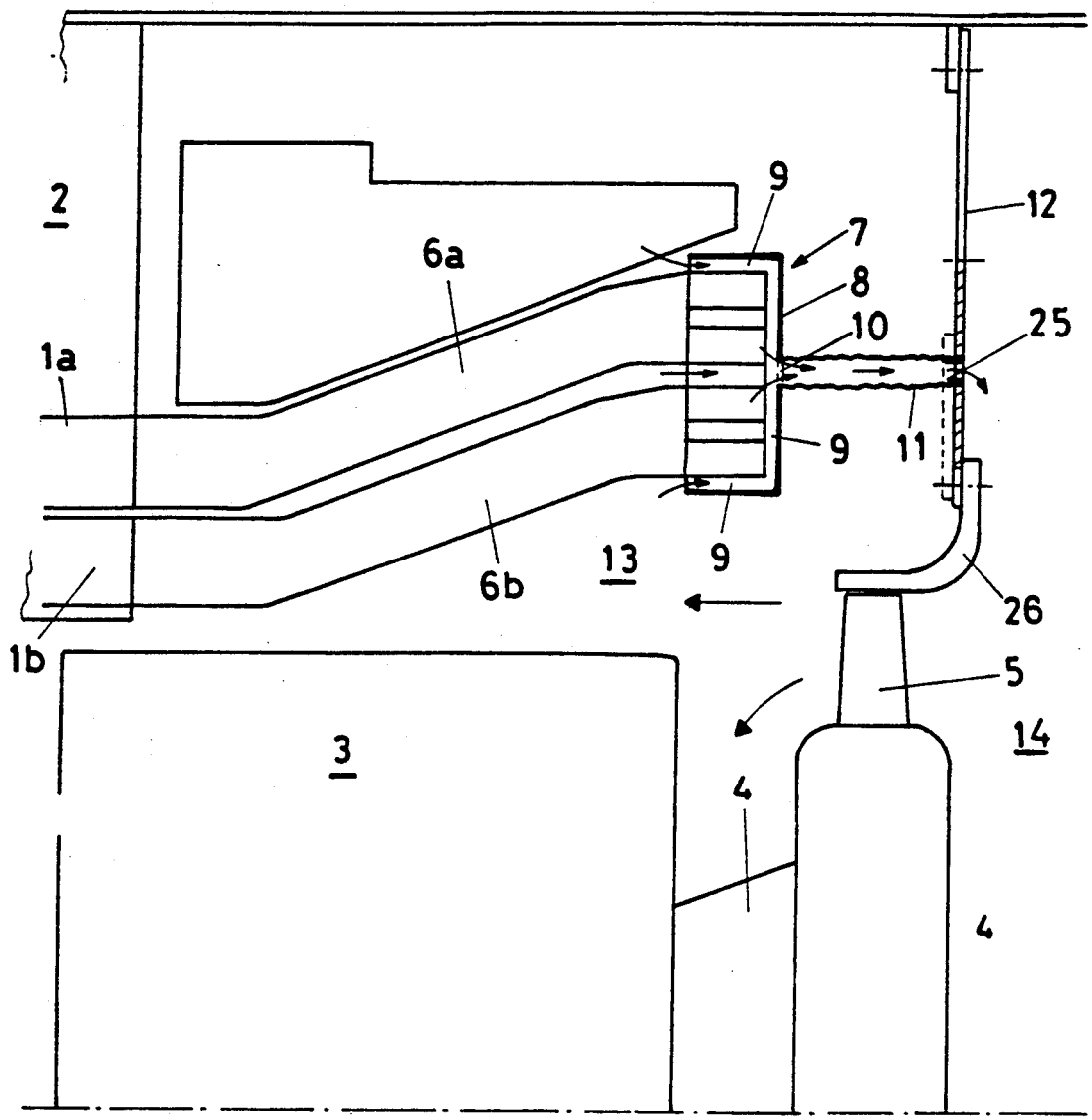
FIG. 1 shows a simplified longitudinal section through the end part of a gas-cooled turbogenerator having an indirectly cooled stator winding and force-cooled lugs.
Figure 2:
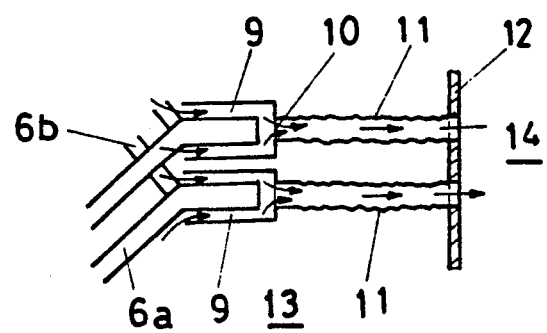
FIG. 2 shows a simplified section in the circumferential direction through the lugs according to FIG. 1.

Referring now to the drawings, wherein like reference numerals designate identical or corresponding parts throughout the several views, the turbogenerator according to FIG. 1 has a stator 2, which is provided with an indirectly cooled stator winding 1, and a rotor 3. An axial fan 5 is mounted on the rotor shaft 4. Located one above the other in each case as a stator groove are 2 stator winding bars 1a and 1b which are continued outside the stator core assembly as front brackets 6a and 6b. The ends of the front brackets are electrically and mechanically connected to one another by lugs 7 in such a way that a three-phase stator winding is produced (cf. FIG. 2). Caps 8 made from insulating material, which leave ducts 9 free between themselves and the bar ends, are pushed over the lugs. On the end averted from the stator core assembly, the caps have an opening 10 to which a flexible line 11 is connected. The flexible lines all lead through a partition 12 which separates the overhang space 13 from the suction chamber 14 of the fan 5.

During operation of the turbogenerator, overpressure prevails in the overhang space 13 with respect to the suction chamber 14 of the fan 5, with the result that a component stream of the coolant (air or hydrogen) conveyed by the fan blows through the ducts 9 and flexible lines 11 and cools the conductor bar ends and lugs.

Figures 3, 4:
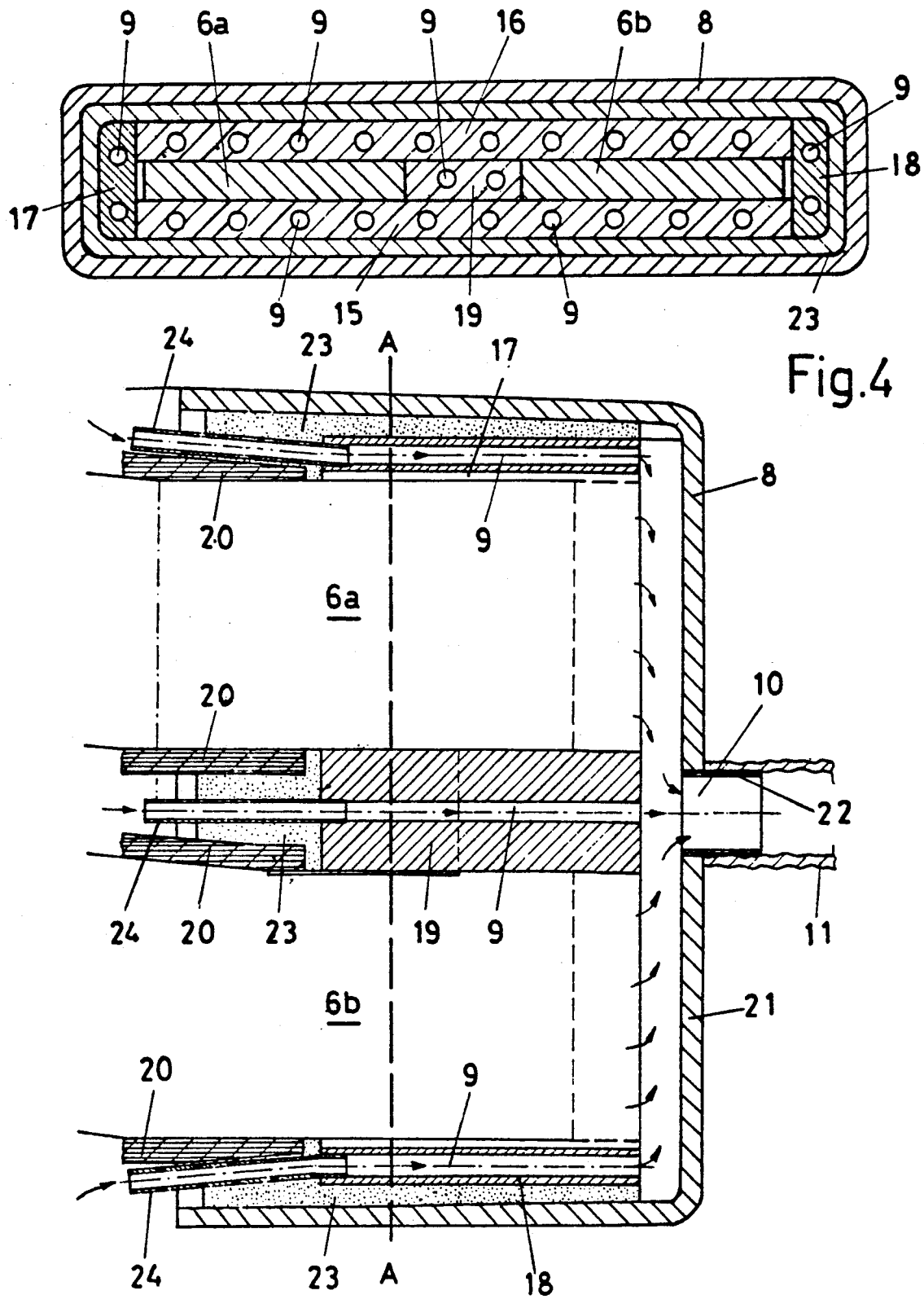
FIG. 3 shows a longitudinal section, providing more detail, through the winding overhang end of the turbogenerator in accordance with FIG. 1.
FIG. 4 shows a cross section through the winding overhang end in accordance with FIG. 3 along the line AA therein.
Figure 5:
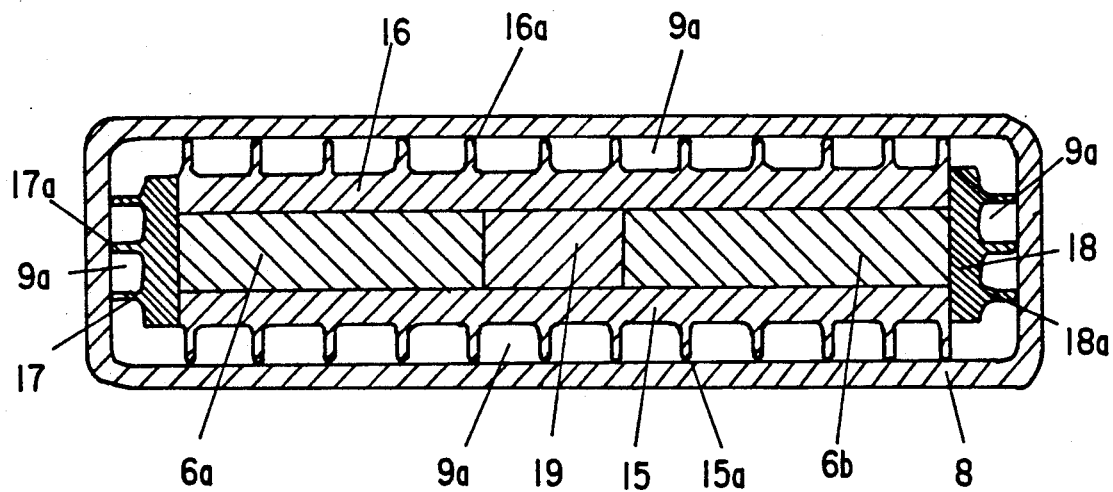
FIG. 5 shows in section an alternative embodiment of a force-cooled lug having cooling ribs.

FIG. 3 and FIG. 4 provide a detailed picture of the lugs 7 and the caps 8 pushed thereover. The lugs are assembled from individual plates, two lateral plates 15, 16, two cover plates 17, 18, and a center plate 19, which are soldered to the conductor bar ends 6a and 6b. All the plates 15 to 19 have axially extending ducts 9, through-bores in the case of the example. The winding insulation 20 of the stator winding bars 6a, 6b reaches up to below the cap 8. The latter preferably consists of glass fiber-reinforced plastic. The end face 21 of the cap is spaced from the end faces of the conductor bars 6a, 6b, and has an opening 10 with a pipe socket 22, which is freely connected to the ducts 9. Fixing the cap 8 to the lug 7 is performed by sealing with a filler, for example epoxy resin or polyurethane resin. Because the cap 8 should project over the plates 15 to 19 for reasons of insulation, the ducts 9 are extended in the direction of the machine interior by tubes 24 of insulating material which end outside the cap in the overhang space 13. Instead of through-bores, it is also possible for the ducts 9 to be formed by the interspaces 9a of axially extending cooling ribs 15a, 16a, 17a, 18a which are formed on the outer surface of the metallic plates 15 to 18. This variant is illustrated by way of example in FIG. 5. Fastening the cap 8 can then, if necessary, be performed without auxiliary means by pressing onto the lugs.

The flexible line 11, for example made from PFTE, is pushed onto the pipe sockets 22. The other end of the flexible line 11 leads to the partition 12, which is likewise provided with inwardly directed sockets 25. It is clear from FIG. 1 that the flexible lines 11 can easily be mounted after removal of the fan casing 26, which is screwed to the partition 12.

Figure 6:
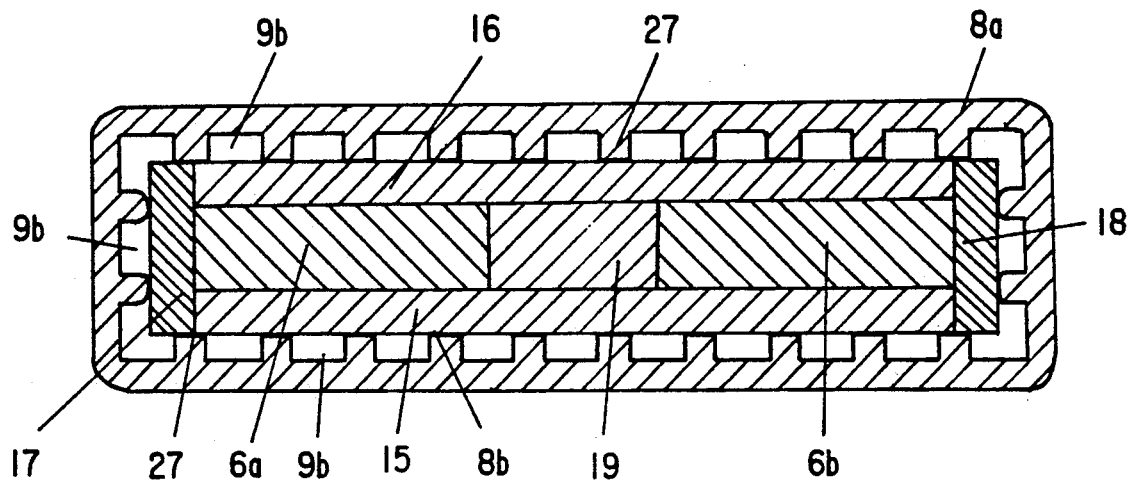
FIG. 6 shows a modification of the cap in accordance with FIGS. 3 and 4 for retrofitting.

The invention can also be applied, if desired, with comparatively little expenditure to existing machines. This is illustrated in FIG. 6. For this purpose, after removal of the insulation of the lugs a cap 8a made from insulating material is pushed onto the lugs and fastened there. With this type of cap, the ducts for guiding the coolant are formed by interspaces 9b between inwardly directly tabs 8b in the cap 8a.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas-cooled electric machine having a rotor, a stator having an indirectly cooled stator winding and a housing surrounding the stator, having one or two stator winding bars, which are located one above the other in a groove, are built up from mutually insulated component conductors and are connected to one another electrically and mechanically outside the stator core assembly in the overhang space by means of metallic lugs to form a winding, and a fan on each machine side whose suction chamber is separated by a partition from the overhang space, wherein the lugs are provided with a cap which surrounds the lugs, and there are provided in the lugs or in the cap ducts which extend essentially axially and are open towards the stator core assembly and in communication with said overhang space such that cooling gas flows from said overhang space into said ducts, and the cap has at its end on the partition side an opening which is freely connected to said ducts and is connected to a flexible line which leads directly into the suction chamber of the fan.

2. The electric machine as claimed in claim 1, wherein the lugs are provided with through-bores which extend essentially axially.

3. A gas-cooled electric machine having a rotor, a stator and a housing surrounding the stator, having one or two stator winding bars, which are located one above the other in a groove, are built up from mutually insulated component conductors and are connected to one another electrically and mechanically outside the stator core assembly in the overhang space by means of metallic lugs to form a winding, and a fan on each machine side whose suction chamber is separated by a partition from the overhang space, wherein the lugs are provided with a cap which surrounds the lugs, and there are provided in the lugs or in the cap ducts which extend essentially axially and are open towards the stator core assembly, and the cap has at its end on the partition side an opening which is freely connected to said ducts and is connected to a flexible line which leads directly into the suction chamber of the fan;

wherein the lugs are provided with cooling ribs which extend essentially axially.

4. A gas-cooled electric machine having a rotor, a stator and a housing surrounding the stator, having one or two stator windings bars, which are located one above the other in a groove, are built up from mutually insulated component conductors and are connected to one another electrically and mechanically outside the stator core assembly in the overhang space by means of metallic lugs to form a winding, and a fan on each machine side whose suction chamber is separated by a partition from the overhang space, wherein the lugs are provided with a cap which surrounds the lugs, and there are provided in the lugs or in the cap ducts which extend essentially axially and are open towards the stator core assembly, and the cap has at its end on the partition side an opening which is freely connected to said ducts and is connected to a flexible line which leads directly into the suction chamber of the fan;

wherein the interior of the cap is provided with inwardly directed projections which leave ducts free between them.

5. A gas-cooled electric machine having a rotor, a stator having an indirectly cooled stator winding and a housing surrounding the stator, having one or two stator winding bars, which are located one above the other in a groove, are built up from mutually insulated component conductors and are connected to one another electrically and mechanically outside the stator core assembly in the overhang space by means of metallic lugs to form a winding, and a fan on each machine side whose suction chamber is separated by a partition from the overhang space, wherein the lugs are provided with a cap which surrounds the lugs, and there are provided in the lugs or in the cap ducts which extend essentially axially and are open towards the stator core assembly and in communication with said overhang space such that cooling gas flows from said overhang space into said ducts, and the cap has at its end on the partition side an opening which is freely connected to said ducts and is connected to a flexible line which leads directly into the suction chamber of the fan, wherein said ducts extend along an outside portion of said winding bars such that cooling gas from said overhang space flows along said ducts to thereby cool end portions of the stator winding.

6. A gas-cooled electric machine having a rotor, a stator having an indirectly cooled stator winding and a housing surrounding the stator, having at least one winding bar which extends outside of a stator core assembly into an overhang space, and wherein an end portion of said at least one winding bar is received within a cap, and further wherein cooling ducts are provided within an interior of said cap and and outside of said winding bar, wherein said ducts are open towards and in communication with said overhang space, and wherein a fan is provided on each machine side whose suction chamber is separated by a partition from the overhang space, said cap having an end on the partition side which includes an opening connected to said ducts, whereby cooling gas enters said ducts from said overhang space, and exits through the opening provided in said cap and thereafter leads directly into the suction chamber of the fan and wherein said end portion of said at least one winding bar is cooled as cooling gas travels through said ducts.

* * * * *